United States Patent [19]

Konishi et al.

[11] 4,365,043

[45] Dec. 21, 1982

[54] RESINOUS PARTICLES FOR COATING COMPOSITION AND ITS PRODUCTION

[75] Inventors: Sakuichi Konishi, Nara; Yukio Omori, Kobe; Hiroyoshi Kataoka, Osaka, all of Japan

[73] Assignee: Nippon Paint Co., Ltd., Osaka, Japan

[21] Appl. No.: 777,548

[22] Filed: Mar. 14, 1977

[30] Foreign Application Priority Data

Mar. 12, 1976 [JP] Japan .................................. 51-27935
Mar. 12, 1976 [JP] Japan .................................. 51-27936

[51] Int. Cl.³ ...................... C08L 33/08; C08L 61/28; C08L 63/00; C08L 67/00
[52] U.S. Cl. .................................. 525/113; 523/427; 524/512; 524/539; 524/540; 524/507; 524/904; 525/119; 525/163; 525/382; 525/124; 525/423; 525/424; 525/428; 525/438; 525/440; 525/443; 525/510; 525/528; 525/524
[58] Field of Search ............... 528/486, 488, 487, 489, 528/490, 493; 260/29.2 EP, 29.3, 29.4, 29.2 TN; 525/113, 119, 382, 440

[56] References Cited

U.S. PATENT DOCUMENTS

| | | | |
|---|---|---|---|
| 2,940,960 | 6/1960 | Tegge et al. | 528/486 |
| 3,483,174 | 12/1969 | Libengood et al. | 528/486 |
| 3,494,903 | 2/1970 | Kochbar | 528/486 |
| 3,737,401 | 6/1973 | Tsou et al. | 260/34.2 |
| 3,925,181 | 12/1975 | McGinniss | 260/29.2 TN |
| 3,993,849 | 11/1976 | Victorius | 260/31.6 |
| 4,031,302 | 6/1977 | Shimizu et al. | 528/486 |
| 4,049,744 | 9/1977 | Masters | 260/29.2 EP |

*Primary Examiner*—Allan Lieberman
*Attorney, Agent, or Firm*—Wenderoth, Lind & Ponack

[57] ABSTRACT

A process for preparing resinous particles for a coating composition, which comprises the steps of (1) subjecting an aqueous resin composition having an ionic group and no material solubility or dispersibility in water is dissolved or dispersed in an aqueous medium by at least partly neutralizing the ionic group to treatment with a powdering agent while applying thereto an operation for pulverization to deposit the resin in a particulate form and (2) recovering the deposited resinous particles from the aqueous medium.

12 Claims, No Drawings

RESINOUS PARTICLES FOR COATING COMPOSITION AND ITS PRODUCTION

The present invention relates to a process for preparing resinous particles for a coating composition. More particularly, it relates to an improved process for preparing a coating composition in a slurry or powdery form.

From the viewpoint of avoiding the use of organic solvents which may cause environmental pollution, there have been proposed various coating compositions such as water-soluble coating compositions, emulsion coating compositions, slurry coating compositions and powder coating compositions. Among them, the last two coating compositions are particularly advantageous in terms of inclusion of only small amounts of harmful or polluting materials, simplicity of post treatment, easy recovery for reuse, etc.

For preparation of slurry coating compositions and powder coating compositions, there is known a method which comprises admixing a liquid composition comprising a resin dissolved in an organic solvent with a coagulating liquid which is miscible with the organic solvent and does not dissolve the resin therein to deposit the resin, collecting the deposited resin and drying or dispersing into an aqueous medium the recovered resin. Alternatively, the liquid composition may be subjected to spray drying, optionally followed by dispersing the resulting dried resin into an aqueous medium. However, these methods require essentially the use of organic solvents in large amounts and are therefore disadvantageous from the viewpoints of environmental pollution, firing, economy, etc.

The present invention is directed to the improvement of the said conventional method for production of a coating composition in a slurry of powdery form not materially using any organic solvent. Thus, a main object of the present invention is to provide an improved process for preparing resinous particles suitable for a coating composition not materially using any organic solvent. Another object of this invention is to provide an improved process for preparing a slurry or powder coating composition not materially using any organic solvent. These and other objects of this invention will be apparent to those skilled in the art from the foregoing and subsequent descriptions.

The process for preparing resinous particles for a coating composition according to this invention comprises the steps of (1) subjecting an aqueous resin composition, wherein a resin having an ionic group and no material solubility or dispersibility in water is dissolved or dispersed in an aqueous medium by at least partly neutralizing the ionic group in the resin, to treatment with a powdering agent while applying thereto an operation for pulverization to deposit the resin in a particulate form and (2) recovering the deposited resinous particles from the aqueous medium.

In the process of the invention, a resin is dissolved or dispersed in an aqueous medium by utilization of the neutralization reaction. Thus, the resin may be any one conventionally employed for formation of a coating film but is required to have at least one ionic group in the molecule so as to be soluble or dispersible in an aqueous medium by neutralizing a part or all of the ionic groups. Examples of the ionic group include an acidic group such as carboxyl and a basic group such as primary, secondary or tertiary amino. In addition to the ionic group, the resin may include any other functional group such as an epoxy group or a hydroxyl group. Specific examples of the resin wherein the ionic group is acidic are acrylic resins having carboxyl groups, alkyd resins having carboxyl groups, acrylic resins having carboxyl groups and crosslinkable functional groups (e.g. epoxy, hydroxyl), alkyd resins having carboxyl groups and crosslinkable functional groups (e.g., epoxy, hydroxyl), acryl-modified alkyd resins obtained by copolymerization of said alkyd resins with polymerizable acrylic monomers, etc. Specific examples of the resin wherein the ionic group is basic are epoxy resins having primary, secondary or tertiary amino groups (prepared, for instance, by adding organic amino compounds to the epoxy groups in epoxy resins or epoxy-modified resins such as copolymers of phenol glycidyl ether, glycidyl ethers of phenol-aldehyde condensates, glycidyl acrylate or glycidyl methacrylate with other polymerizable monomers), acrylic or vinylic resins having primary, secondary or tertiary amino groups (prepared, for instance, by copolymerization of nitrogen-containing vinyl compounds such as amino group-containing acrylates, amino group-containing methacrylates, vinylpyridines and vinylimidazoles with vinyl compounds having no free carboxyl group), polyamide resins having primary, secondary or tertiary amino groups (prepared, for instance, by polycondensing dibasic acids with polyvalent amines), etc.

For neutralization of the ionic group in the resin so as to dissolve or disperse such resin in an aqueous medium, there may be used an inorganic basic substance (e.g. potassium hydroxide, sodium hydroxide, potassium carbonate, ammonia) or an organic basic substance (e.g. methylamine, triethylamine, monoethanolamine, dimethylethanolamine, triethanolamine, ethylenediamine, diethylenetriamine) when the ionic group is acidic, or an inorganic acidic substance (e.g. hydrochloric acid, sulfuric acid, phosphoric acid, carbonic acid) or an organic acidic substance (e.g. formic acid, acetic acid, monochloroacetic acid, dichloroacetic acid, trichloroacetic acid, lactic acid, butyric acid, glycollic acid) when the ionic group is basic.

The extent of the neutralization of the ionic group so as to dissolve or disperse the resin in an aqueous medium is considerably varied with the kind of the resin and may be usually not less than about 10%, preferably not less than about 30%.

In addition to the resin dissolved or dispersed in an aqueous medium, the aqueous resin composition may comprise any conventional additive(s) such as a coloring agent, a crosslinking agent and a modifier.

The coloring agent may be pigments, dyes or the like.

As the crosslinking agent, there may be used any conventional crosslinkable resin or compound which can react with the functional group (e.g. carboxyl, primary, secondary or tertiary amino, hydroxyl, epoxy) present in the resin. Particularly preferred is one which is itself miscible with the resin or is miscible with such resin at least on baking to afford a uniform coating film. Examples of the crosslinking agent capable of reacting with a carboxyl group or a primary, secondary or tertiary amino group are two or more epoxy group-containing compounds such as epoxy resins or triglycidyl isocyanurate. Examples of the crosslinking agent capable of reacting with a hydroxyl group are aminoplast resins such as urea resins, melamine resins (e.g. hexamethoxymethylmelamine) and benzoguanamine, and polyisocyanate compounds containing a blocked isocyanate group.

As the modifier, there may be used a substance being miscible with the resin and showing an effect of improving the quality of a coating film. Specific examples are natural resins, cellulose derivatives such as cellulose acetate butyrate, alkyd resins, acrylic resins, vinyl resins, etc.

On practical use, the crosslinking agent and the modifier may be as such incorporated into the aqueous resin composition when they are in a liquid form. In case of these agents being solid and hardly miscible as such, they may be melted or dissolved in a suitable solvent on admixture with the aqueous resin composition.

The preparation of the aqueous resin composition may be effected in a conventional manner. For example, an aqueous solution or dispersion of the resin may be admixed with a coloring agent and subjected to a conventional dissolving or dispersing treatment, if necessary, followed by addition of a crosslinking agent, a modifier and the like to obtain a desired aqueous resin composition. The content of non-volatile components in such aqueous resin composition is usually designed to be from about 5 to 80% by weight, preferably from about 10 to 60% by weight.

The thus prepared aqueous resin composition is then subjected to treatment with an agent capable of acting on the neutralized ionic group (hereinafter referred to as "powdering agent") to make it free (hereinafter referred to as "separation treatment"), if necessary, followed by particle formation treatment.

When the ionic group in the resin is acidic, the said separation treatment is conducted with an acidic substance. As the acidic substance, there may be used any one which can be dissolved in water to afford hydrogen ions. Specific examples are inorganic acids such as sulfuric acid, hydrochloric acid, phosphoric acid and carbonic acid, organic acids such as formic acid, acetic acid, monochloroacetic acid, dichloroacetic acid, trichloroacetic acid, lactic acid, butyric acid and glycolacetic acid, acidic gases such as carbon dioxide and sulfur dioxide, etc. The inorganic or organic acid may be used as an aqueous solution, usually in a concentration of 1 N or less. The acidic gas may be employed solely or in combination with air or an inert gas such as nitrogen in an appropriate proportion. The amount of the acidic substance to be used may be approximately equivalent to the neutralized ionic groups in the resin.

When the ionic group in the resin is basic, the said separation treatment is conducted with a basic substance. As the basic substance, there may be employed any one which can be dissolved in water to accept hydrogen ions. Specific examples are inorganic bases such as sodium hydroxide, potassium hydroxide, potassium carbonate and ammonia, organic bases such as triethylamine and dimethylaminoethanol, basic gases such as gaseous ammonia, etc. The inorganic or organic base may be used as an aqueous solution, usually in a concentration of 1 N or less. The basic gas may be employed solely or in combination with air or an inert gas such as nitrogen in an appropriate proportion. The amount of the basic substance to be used may be approximately equivalent to the neutralized ionic groups in the resin.

The separation treatment may be effected by an appropriate procedure depending on the form and the size of the resinous particles to be formed. For example, the following procedures may be adopted:

(a) A procedure which comprises gradually introducing the acidic or basic gas into the aqueous resin composition under vigorous stirring;

(b) A procedure which comprises gradually adding the aqueous resin composition into an aqueous solution of the acidic or basic substance under vigorous stirring, or vice versa; in this case, the presence of a water-soluble high polymer having a dispersing ability such as polyethylene oxide or poval (polyvinylalcohol), cellulose derivatives such as hydroxyethylcellulose, or a dispersing agent of low molecular weight such as an anionic, cationic or nonionic surfactant, in the aqueous solution of the acidic or basic substance makes the resulting resinous particles more spherical; when the coating composition comprising such spherical resin particles is applied to the surface of a substrate to be coated, the resin particles are arranged on the surface more densely so that a more smooth and lustrous coating film can be obtained;

(c) A procedure which comprises spraying the aqueous resin composition onto or into an aqueous solution of the acidic or basic substance, if necessary, while stirring; in this case, it is advantageous to make the dispersing agent present as in the above mentioned procedure (b);

(d) A procedure which comprises spraying the aqueous resin composition into the atmosphere of the acidic or basic gas;

(e) A procedure which comprises contacting the aqueous resin composition in a mist form with an aqueous solution of the acidic or basic substance in a mist form.

By the above separation treatment, the neutralized ionic groups in the resin are made free groups, and resinous particles are separated. As to the particle form of the resinous particles, the procedures (c), (d) and (e) bring about a more round, globular particle form compared with the procedures (a) and (b). The particle size of the resinous particles can be appropriately controlled depending on the conditions of the separation treatment (e.g. the viscosity of the resin, the speed of the stirring, the diameter of the spraying nozzle, the spraying viscosity).

The resinous particles formed in the separation treatment are then recovered by a conventional separation procedure such as filtration, sieving and centrifugation. If necessary, the mixture after the separation treatment may be treated with a neutralizing agent so as to neutralize the excessive acidic or basic substance.

The thus recovered resinous particles can be used as a coating composition. For a powder coating composition, the resinous particles may be employed as such. For a slurry coating composition, the resinous particles are dispersed in an aqueous medium and then used. When the resinous particles are contaminated with unfavorable impurities such as salts, the impurities may be removed by a conventional elimination procedure, for instance, washing with water.

The application of the coating composition in a powdery form onto a substrate to be coated may be carried out by various procedures, e.g. air spraying, electrostatic coating, fluid bed coating, etc. The applied coating composition is then dried and baked under suitable conditions whereby a smooth and lustrous coating film is formed.

When the coating composition in a slurry form is applied by a conventional spraying or roll coating procedure, evaporation of water from the wet film is faster than in the case of using a conventional water-soluble or emulsion type aqueous paint for baking, so that a coating film having a larger film thickness is readily obtainable, and thus the workability of the coating operation is greatly improved. Besides, it is confirmed that the formed coating film after baking is superior in smoothness and luster to a coating film obtained from a conventional powdery paint.

The coating composition of the invention can be obtained according to the invention without generating noise and scattering of dust, explosion of dust and other dangers at the pulverizing step, unlike the conventional process which comprises the step of pulverizing a solid composition. Besides, the particle form and the particle size can be readily controlled as mentioned above, and the kind of the resin to be used is selected optionally in a wide range.

According to the process of the invention, formation of a large amount of a solvent mixture as the by-product is avoided, unlike the conventional method in which the resin particles are precipitated by utilizing the difference in abilities of solvents to dissolve the resin components, so that environmental pollution is prevented. Besides, it is advantageous from the economical viewpoint that operations required for recycling, recovery or removal of such solvent mixture in the production or coating step is simplified. In addition, the risk of explosion in case of using acetone or other solvents can be minimized.

Since the aqueous resin composition before the separation treatment is in a solution or dispersion state, conventional techniques for dispersion of a pigment into a liquid medium can be utilized. The adsorption of the resin to the pigment is thus effectively attained, compared with a conventional powdery paint or a paint in slurry form obtained by dispersing a powdery paint in water, so that a coating film having excellent luster and smoothness can be obtained. In addition, a conventional color matching procedure is adoptable to realize a matching with ease and high preciseness.

The illustrations as hereinabove described are concerned with the preparation of resinous particles and a coating composition including them by the use of a resin having an ionic group in the molecule. Even when a resin having no ionic group is used in place of the said resin, it is still possible to produce resinous particles and a coating composition including them by applying a technical concept as chemically equivalent thereto.

Thus, an aqueous resin composition, wherein a resin having no ionic group and no solubility or dispersibility in water is dispersed in an aqueous medium in the presence of a dispersing agent having an ionic group by at least partly neutralizing the ionic group in the dispersing agent, is subjected to treatment with a powdering agent while applying thereto an operation for pulverization to deposit the resin in a particulate form, and the deposited resinous particles are recovered from the aqueous medium.

The ionic group in the dispersing agent may be acidic or basic. As hereinabove stated, the neutralization may be carried out by the use of a basic substance in case of the ionic group being acidic or by the use of an acidic substance in case of the ionic group being basic. When the ionic group is acidic, the separation treatment may be conducted with an acidic substance. When the ionic group is basic, the separation treatment may be conducted with a basic substance.

As the neutralized acidic group-containing dispersing agent, there may be used an emulsifier or an anionic surfactant. Specific examples are sodium oleate, potassium oleate, castor oil potassium soap, etc. Examples of the neutralized basic group-containing dispersing agent are cationic surfactants such as alkylammonium salts (e.g. primary, secondary or tertiary laurylammonium acetate) and alkyl group-containing quaternary ammonium salts.

The aqueous resin composition may be prepared, for instance, by polymerization of polymerizable monomers in an aqueous medium in the presence of a previously neutralized dispersing agent, or by admixing a liquid resin (i.e. a solution of a resin in a water-miscible solvent or a melted resin) with an aqueous medium by the aid of a previously neutralized dispersing agent.

The subsequent operations may be carried out in the same manner as in case of using a resin having an ionic group. While the thus prepared resinous particles are provided with the same excellent physical properties as possessed by those obtained by the use of a resin having an ionic group, the former are sometimes obtainable in a finer and more spherical state than the latter.

Practical and presently preferred embodiments of the invention are illustratively shown in the following Examples wherein parts and % are by weight.

EXAMPLE 1

Thirty parts of an aqueous solution comprising a water-soluble acrylic resin (which comprises units of acrylic acid, hydroxypropyl acrylate, methyl methacrylate, n-butyl methacrylate, styrene and n-butyl acrylate in a weight ratio of 14.5:8.9:14.9:16.1:26:16.6, 100% of the carboxyl groups in the molecule being neutralized with dimethylethanolamine) in a concentration of 38%, 2.9 parts of hexamethoxymethylmelamine and 0.71 part of water-dispersible aluminum powders are mixed together, and the resulting mixture is admixed with 30 parts of water to make an aqueous resin composition.

The aqueous resin composition (63.61 parts) is dropwise added to a 1/20 N aqueous hydrochloric acid solution (500 parts) in about 15 minutes while stirring by a high speed mixer. After completion of the addition, excessive hydrochloric acid in the resulting mixture was neutralized with a 1 N aqueous potassium hydroxide solution and the mixture was sieved through a sieve of 250 mesh to obtain a dispersion of resinous particles having a particle size of 10 to 30μ. The resin particles are washed with water and dispersed in water to make a coating composition in a slurry form having a solid content of 50%.

The coating composition in a slurry form is applied to a polished steel plate by air spraying and baked at 160° C. for 30 minutes, whereby a smooth and lustrous metallic finish coating film is formed. When the coating film is subjected to an impact test by DuPont's method, a value of 20 cm or more (500 g) is obtained. It is thus confirmed that sufficient crosslinking has been attained.

EXAMPLE 2

The dispersion of resin particles obtained in Example 1 is washed with water and dried at 50° C. for 3 hours in a fluidized bed drier to make a powder coating composition. The powder coating composition is applied to a steel plate by electrostatic coating and baked at 160° C. for 30 minutes, whereby a well crosslinked, smooth and lustrous metallic finish coating film is formed.

EXAMPLE 3

One hundred parts of an isopropanol solution comprising a polyester resin (which has a number average molecular weight of 1500 and an acid value of 110 and wherein 50% of the carboxyl groups are neutralized with triethylamine) in a concentration of 70%, 30 parts of benzoguanamine, 60 parts of titanium oxide ("Tipake R-820", trademark of Ishihara Sangyo Kaisha, Ltd.) and 640 parts of water are mixed together to make an aqueous resin composition.

The aqueous resin composition is air sprayed into the surface of a 1/20 N aqueous hydrochloric acid solution charged in a vessel while stirring. The precipitated materials are collected by centrifugation, washed with water and dispersed in water to make a coating composition in a slurry form having a solid content of 50%.

The coating composition in a slurry form is applied to a polished steel plate by air spraying and baked at 160° C. for 30 minutes, whereby a smooth and lustrous coating film is formed. When the coating film is subjected to the extrusion test using an Erichsen tester, a value of 3 mm or more is obtained. It is thus confirmed that sufficient crosslinking has been attained.

EXAMPLE 4

The aqueous resin composition used in Example 3 is air sprayed onto the surface of a 1/20 N aqueous hydrochloric acid solution charged in a vessel while stirring. The precipitated materials are collected by centrifugation, washed with water and dried at 50° C. for 3 hours in a fluidized bed drier to prepare a powder coating composition, which is applied to a steel plate by electrostatic coating and baked at 160° C. for 30 minutes, whereby a well crosslinked, smooth and lustrous coating film is formed.

EXAMPLE 5

The polyester resin dispersion as employed in Example 3 (100 parts) and a polyisocyanate compound containing a blocked isocyanate group (14 parts) are melt mixed at a temperature higher than the melting temperature of the polyisocyanate compound (e.g. 90° C.), and 70% of the carboxyl groups in the resin mixture are neutralized with dimethylethanolamine. The resultant mixture (114 parts) is admixed with titanium oxide as employed in Example 3 (30 parts) and water (350 parts) to make an aqueous resin composition.

The aqueous resin composition is air sprayed into a stream of carbon dioxide to make resinous spherical particles, which are washed with water and dispersed in water to prepare a coating composition in a slurry form having a solid content of 50%. Alternatively, the said resinous spherical particles may be washed with water and dried to prepare a powder coating composition.

EXAMPLE 6

Acrylic acid (15 parts), 2-hydroxyethyl methyacrylate (15 parts), methyl methacrylate (38 parts), styrene (19 parts) and n-butyl acrylate (8 parts) are mixed together to make a liquid composition. The thus prepared liquid composition (20 parts) is charged in a flask, and while stirring at 130° C., a mixture of the said liquid composition (75 parts) and azobisisobutyronitrile (1.5 parts) is dropwise added thereto in 3 hours. After completion of the addition, stirring is continued at the same temperature for 1 hour. Then, a 10% aqueous solution of sodium hydroxide (36 parts) is added to the resulting mixture at 110° C., and after stirring for 30 minutes, water (150 parts) is added thereto at a temperature of lower than 100° C. to obtain a resin mixture. To the resin mixture (100 parts), hexamethoxymethylmelamine (10 parts) and aluminum powders ("Alpaste 5105 WA", trademark of Toyo Aluminium K.K.) (30 parts) are added, and the resultant mixture is dispersed well to make an aqueous resin composition.

The aqueous resin composition (100 parts) is diluted with water (200 parts), and a 1/10 N aqueous hydrochloric acid solution (700 parts) is added thereto, followed by stirring with a labomixer. The resultant mixture is neutralized with a 1/10 N aqueous sodium hydroxide solution, and the aqueous medium is eliminated to obtain resinous particles having a particle size of 10 to 20μ. The resinous particles are washed with water to eliminate the produced sodium chloride and dispersed in water to make a coating composition in a slurry form having a solid content of 50%.

The coating composition in a slurry form is applied to a polished steel plate by air spraying and baked at 160° C. for 30 minutes, whereby a smooth and lustrous coating film is formed.

When the said resinous particles are washed with water and dried at 50° C. for 3 hours in a fluidized bed drier, there is obtained a powder coating composition, which can also afford a coating film of satisfactory quality.

EXAMPLE 7

An epoxy resin ("Epicoat 1001" manufactured by Shell Chemical Corp.) (488 parts) and diethanolamine (105 parts) are reacted in isopropanol (250 parts) under nitrogen stream at 80° C. for 3 hours to make an aminoepoxy resin solution. To the aminoepoxy resin solution (143 parts), glacial acetic acid (62 parts) is added, deionized water (500 parts) is added thereto, and the resultant mixture is admixed with a blocked polyisocyanate resin solution is methylethylketone (solid content, 50%; 16 parts) and titanium oxide ("Tipake R-820" manufactured by Ishihara Sangyo Kaisha, Ltd.) (30 parts) to make an aqueous resin composition.

The aqueous resin composition (143 parts) is diluted with water (250 parts), and the resulting dilution is dropwise added to 0.05 N aqueous solution of potassium hydroxide while vigorous stirring. After excessive alkali is neutralized with 0.1 N acetic acid, the resultant mixture is subjected to centrifugal separation to collect resinous particles of not more than 50μ in diameter. The resinous particles are washed with water and then dispersed in water to make a coating composition in a slurry form having a solid content of 50%.

The coating composition in a slurry form is applied to a polished steel plate by air spraying and baked at 180° C. for 20 minutes, whereby a smooth and lustrous coating film is formed. When the coating film is subjected to the DuPont's impact test, a value of 20 cm or more (500 g) is obtained. It is thus confirmed that sufficient crosslinking has been attained.

EXAMPLE 8

An aqueous dispersion comprising an aminoacrylic resin (comprising as the monomeric constituents dimethylaminoethyl methacrylate, methyl methacrylate, n-butyl acrylate, 2-hydroxyethyl methacrylate and styrene; glass transition point, 65° C.; weight average molecular weight, 18,000; content of non-volatile components, 80%; dispersing medium, isopropanol:water=1:1 by weight) (100 parts) is admixed with hexamethoxymethylmelamine ("Cymel 303" manufactured by American Cyanamid) (20 parts), a mixture of powdery aluminum ("L-579⇌" manufactured by Silverline Mfg. Co.) (5 parts) and isopropanol (5 parts) is added thereto, and the resultant mixture is admixed with 0.1 N hydrochloric acid to make an aqueous resin composition.

To the aqueous resin composition (100 parts), a mixture of 0.1 N sodium hydroxide solution (500 parts) and polyethylene oxide (10 parts) is added, and the resulting mixture is stirred by the aid of a high speed mixer for 15 minutes. After excessive alkali is neutralized with 0.1 N hydrochloric acid, the resultant mixture is subjected to centrifugal separation to collect resinous particles of not more than 50μ in particle size. The resinous particles are washed with water and dispersed in water to make a coating composition in a slurry form having a solid content of 50%.

The coating composition in a slurry form is applied to a polished steel plate and baked as in Example 7, whereby a smooth and lustrous metallic finish coating film is formed. By the DuPont's impact test method, it is confirmed that sufficient crosslinking has been attained.

EXAMPLE 9

The resinous particles as collected in Example 8 are washed with water and dried by the use of a fluidized bed type dryer to make a coating composition in a powder form. The coating composition is applied onto a polished steel plate electrostatically and then baked at 160° C. for 20 minutes, whereby a smooth and lustrous coating film possessing a good metallic feeling is formed. By the DuPont's impact test method, it is confirmed that sufficient crosslinking has been attained.

EXAMPLE 10

Potassium laurate (3.0 parts) and water (150 parts) are charged into a flask, and a mixture of methyl methacrylate (30 parts), styrene (30 parts), n-butyl methacrylate (20 parts) and 2-hydroxyethyl methacrylate (20 part) and a mixture of 4,4'-abozis-4-cyanovaleric acid (1.0 part), dimethylethanolamine (1.0 part) and water (50 parts) are dropwise added thereto at 70° C. for 3 hours. The resultant mixture is kept at the same temperature to make an aqueous liquid composition.

The aqueous liquid composition (100 parts) is dropwise added to 1/20 N hydrochloric acid (500 parts) with vigorous stirring. After the addition is completed, excessive hydrochloric acid is neutralized with 1/10 N sodium hydroxide solution and subjected to centrifugation, whereby resinous particles of not more than 10μ in particle size are collected.

The resinous particles are washed with water and dispersed into water to give a coating composition in a slurry form. The coating composition is sprayed on a polished steel plate and baked at 130° C. for 20 minutes to make a smooth and lustrous finish coating film.

Separately, the resinous particles as above obtained are washed with water and dried by a fluidized bed dryer to give a coating composition in a powder form. The coating composition is applied onto a polished steel plate by electrostatic coating and baked to make a lustrous, smooth coating film.

What is claimed is:

1. A process for preparing resinous particles for a coating composition which comprises the steps of
   (1) treating
      (A) an aqueous resin dispersion or solution, which comprises
         (a) a resin having carboxyl groups or primary, secondary or tertiary amino groups and no material dispersibility or solubility in water, which resin has been rendered dispersible or soluble in water by at least partly neutralizing the carboxyl groups or the amino groups with a base or an acid, respectively, and
         (b) a water-insoluble crosslinking agent which is crosslinkable with functional groups in the resin,
   with
      (B) an acidic substance or a basic substance as a powdering agent, said acidic substance being used when the resin is one having carboxyl groups, said basic substance being used when the resin is one having primary, secondary or tertiary amino groups,
   under conditions which will deposit the resin in particulate form together with the crosslinking agent uniformly dispersed therein, and
   (2) recovering the deposited resinous particles containing the crosslinking agent from the aqueous medium.

2. The process according to claim 1, wherein the resin contains, in addition to the carboxyl or amino groups, other functional groups.

3. The process according to claim 2, wherein the other functional groups are epoxy or hydroxyl groups.

4. The process according to claim 1, wherein the crosslinking agent is a compound containing at least two epoxy groups, an aminoplast resin, a melamine resin, benzoguanamine or a polyisocyanate compound containing a blocked isocyanate group.

5. The process according to claim 1, wherein the resin is a carboxyl group-containing resin, in which the carboxyl groups are at least partly neutralized with an organic or inorganic base and the powdering agent is an acidic substance.

6. The process according to claim 1, wherein the resin is an amino group-containing resin, in which the amino groups are at least partly neutralized with an organic or inorganic acid and the powdering agent is a basic substance.

7. A process for preparing a coating composition in a slurry form which comprises dispersing the resinous particles prepared by the process according to claim 1 in an aqueous medium.

8. A process for preparing a coating composition in a powdery form which comprises drying the resinous particles prepared by the process according to claim 1.

9. A resinous particle prepared by the process according to claim 13.

10. A coating composition in a slurry form prepared by the process according to claim 7.

11. A coating composition in a powdery form prepared by the process according to claim 8.

12. The process according to claim 1, wherein the aqueous resin dispersion or solution further comprises a pigment.

* * * * *